United States Patent [19]
Forgues

[11] 3,935,108
[45] Jan. 27, 1976

[54] CHANGEOVER VALVES WITH BYPASS AND BENT VALVING

[75] Inventor: Louis V. Forgues, Lunenburg, Mass.

[73] Assignee: Parks-Cramer Company, Fitchburg, Mass.

[22] Filed: Oct. 7, 1974

[21] Appl. No.: 512,520

[52] U.S. Cl. ......... 210/340; 137/599.1; 137/625.47
[51] Int. Cl.² .................. B01D 27/10; F16K 11/22
[58] Field of Search ... 137/340, 599, 599.1, 625.47; 210/277, 278, 340, 341

[56] References Cited
UNITED STATES PATENTS

| | | | |
|---|---|---|---|
| 2,095,064 | 10/1937 | Harper | 137/625.47 X |
| 2,921,687 | 1/1960 | Jenkins | 210/341 |
| 3,135,284 | 6/1964 | Magos | 137/599 X |
| 3,643,692 | 2/1972 | Traylor | 137/599.1 |
| 3,679,060 | 7/1972 | Smith | 210/340 X |

FOREIGN PATENTS OR APPLICATIONS

| | | | |
|---|---|---|---|
| 694,537 | 7/1940 | Germany | 137/599 |
| 579,346 | 7/1959 | Canada | 137/599 |
| 437,119 | 10/1935 | United Kingdom | 137/599 |

*Primary Examiner*—Charles N. Hart
*Assistant Examiner*—Robert H. Spitzer
*Attorney, Agent, or Firm*—Schiller & Pandiscio

[57] ABSTRACT

Changeover valves are provided for a dual filter system which are characterized by auxiliary bypass and vent valving to facilitate changing over from one filter to the other. The bypass valving allows a process fluid to fill the second filter while the first is still in service and without a substantial reduction in process fluid flow or pressure to downstream equipment; and the vent valving permits elimination of air or gases from the second filter before it is put into service.

22 Claims, 9 Drawing Figures

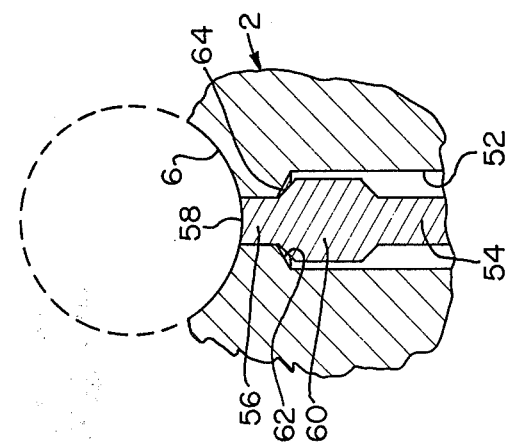
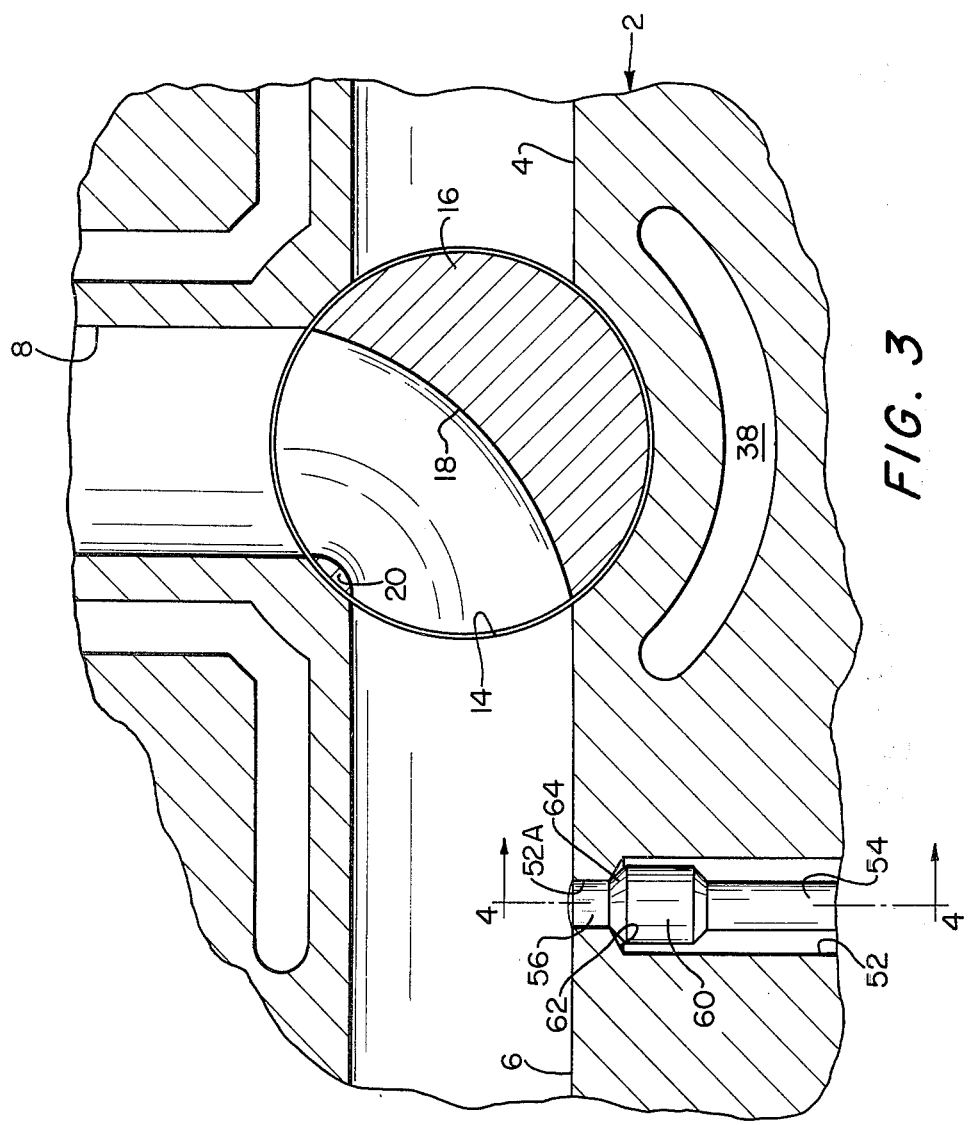

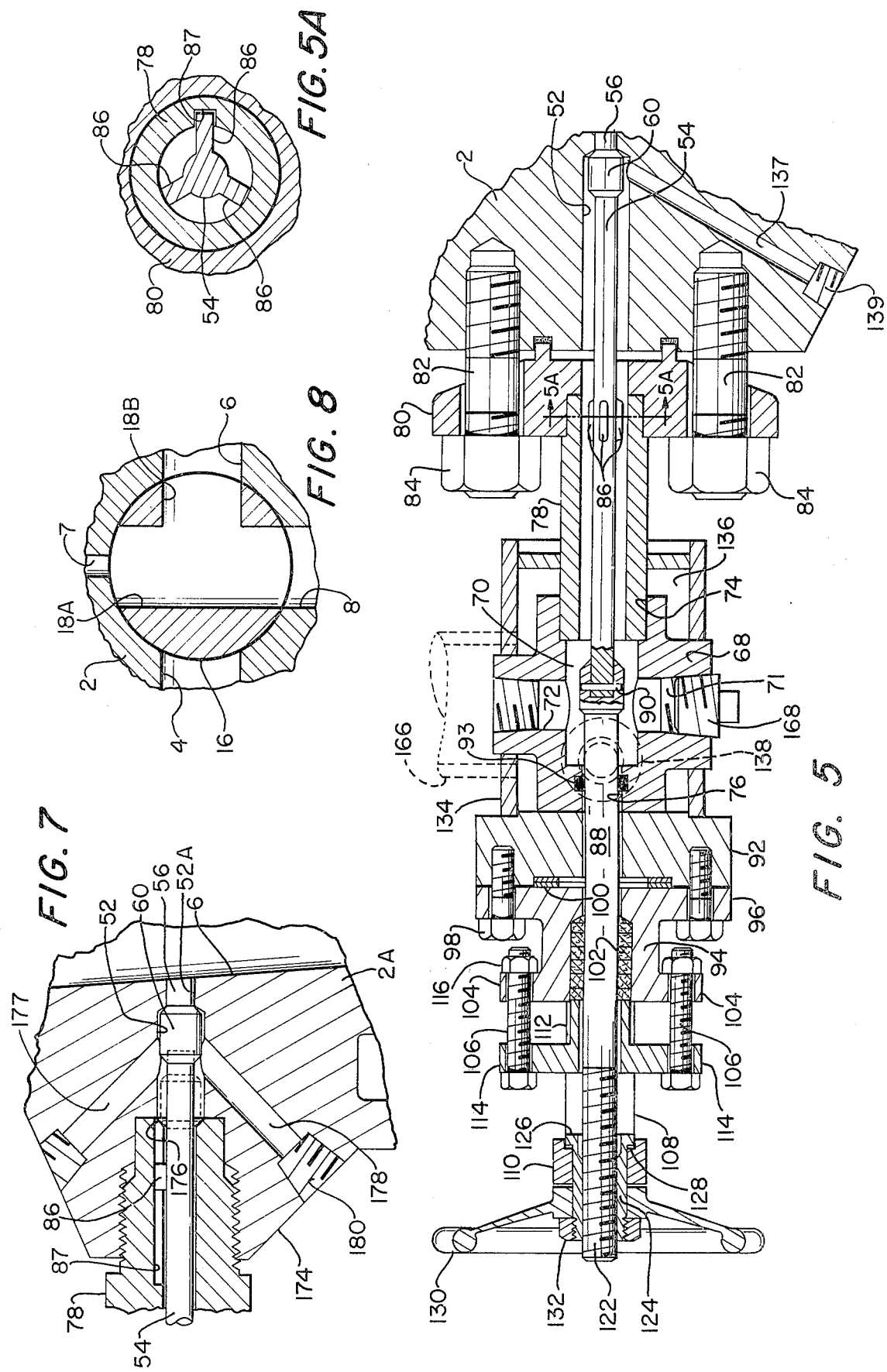

CHANGEOVER VALVES WITH BYPASS AND BENT VALVING

This invention relates to plug valves and more particularly to plug valves with auxiliary by-pass or vent valving.

For a variety of manufacturing processes involving use of process fluids such as "hot melts" and fluid monomer and polymer feedstocks, e.g., nylon and polyesters, it is desirable to operate on a continuous flow basis or with constantly full feedstock supply lines. Such processes typically embody extrusion, injection and blow molding, coating and spraying techniques, e.g., the manufacture of synthetic textile fibers, plastic tubing, plastic sheets and films, and protective or insulating coatings for electrical conductor wires. In such processes it is common practice to include a filter unit in the flow stream to effect removal of impurities which might result in an imperfect product or cause clogging of downstream equipment such as spinnerettes or extrusion dies. As is obvious, filters must be cleaned or replaced periodically. Therefore, in order to permit uninterrupted operation, two parallel filter units (each of which may consist of more than one filter) are provided together with changeover valves for alternately diverting flow through one filter unit or the other, so that one unit is in service while the other is being cleaned or replaced. However, in many processes it is essential that filter changeover be accomplished without any significant reduction in process fluid flow or pressure to downstream equipment and without introducing any air to the flow stream. Furthermore, with a number of process fluids, it is essential that the out-of-service filter unit and any associated filter changeover valves be cleaned with selected solvents, and also that this be done without danger of contaminating the process fluid. However, filter changeover valves already known to persons skilled in the art either do not meet the above-described requirements or else are objectionable for other reasons such as being unduly large, complicated or difficult to clean, maintain and repair. It is to be noted also that where a polymer hot melt is pumped under pressure, the pressure differential across the changeover valve may be as high as 5000 pounds per square inch, and as a result of such pressure differential an excessive force is required to operate the changeover valve to divert flow from one filter to the other.

Accordingly, the primary object of this invention is to provide new and improved valves for use as process equipment changeover valves.

Another object is to provide a novel plug valve for process equipment change-over applications.

Still another object is to provide a diverting plug valve that is suitable for controlling flow of high pressure, high temperature, high viscosity process fluids such as hot melt polymer materials.

A further object is to provide a changeover valve assembly suitable for the purposes described which embodies auxiliary valve means for by-passing or venting selected portions of the changeover valve without having to adjust the latter.

Another object is to provide a valve of the character desdribed which can be supplied with a jacket for liquid or vapor heating or with electrical heating means, and which also includes a by-pass or vent valve which is easy to remove for cleaning.

A more specific object is to provide a dual filter system which comprises two diverting plug valves connected between the two filter units for filter changeover purposes, and auxiliary valving associated with the diverting valves for by-passing or venting fluid at appropriate times during a filter changeover operation.

The foregoing and other objects hereinafter described or rendered obvious are achieved in a preferred embodiment of the invention by providing a three-way diverting plug valve and a pair of auxiliary valves mounted to the plug valve. The plug valve has two passageways each communicating with one of its two outlet (or inlet) chambers, and each auxiliary valve comprises a non-rotatable, longitudinally movable valve member that is mounted in one of said passageways and is adapted to selectively permit or block flow of fluid to or from said chamber via the passsageway. Two such diverting valve assemblies are used in a dual filter system, with each diverting plug valve arranged to selectively couple a main flow line to one or the other of the filter units, with the auxiliary valve means of one being used to optionally cause some of the feedstock fed by the main line to pass to the out-of-service filter unit and the auxiliary valve means of the other being used to vent a filter unit that is to be removed from service for cleaning.

Other features and advantages of the invention are disclosed or rendered obvious by the following detailed description which is to be considered together with the accompanying drawings, wherein:

FIG. 3 is a fragmentary cross-sectional view on an enlarged scale taken along line 3—3 of FIG. 2;

FIG. 4 is an enlarged sectional view taken along line 4—4 of FIG. 3;

FIG. 5 is a longitudinal sectional view of one of the auxiliary valves mounted to the plug valve of FIG. 1;

FIG. 5A is a cross-sectional view taken along line 5A-5A of FIG. 5;

FIGS. 7 and 8 illustrate modifications of the plug valve.

In the drawings, like numerals refer to like parts.

I have recognized that in systems of the character described reductions in process fluid flow and process fluid pressure to downstream process equipment can be substantially avoided and operation of the changeover valve can be facilitated by providing auxiliary valving in association with the changeover valve for allowing a small stream of feedstock to fill the second clean filter while the first dirty filter is still in service.

Figure 1:
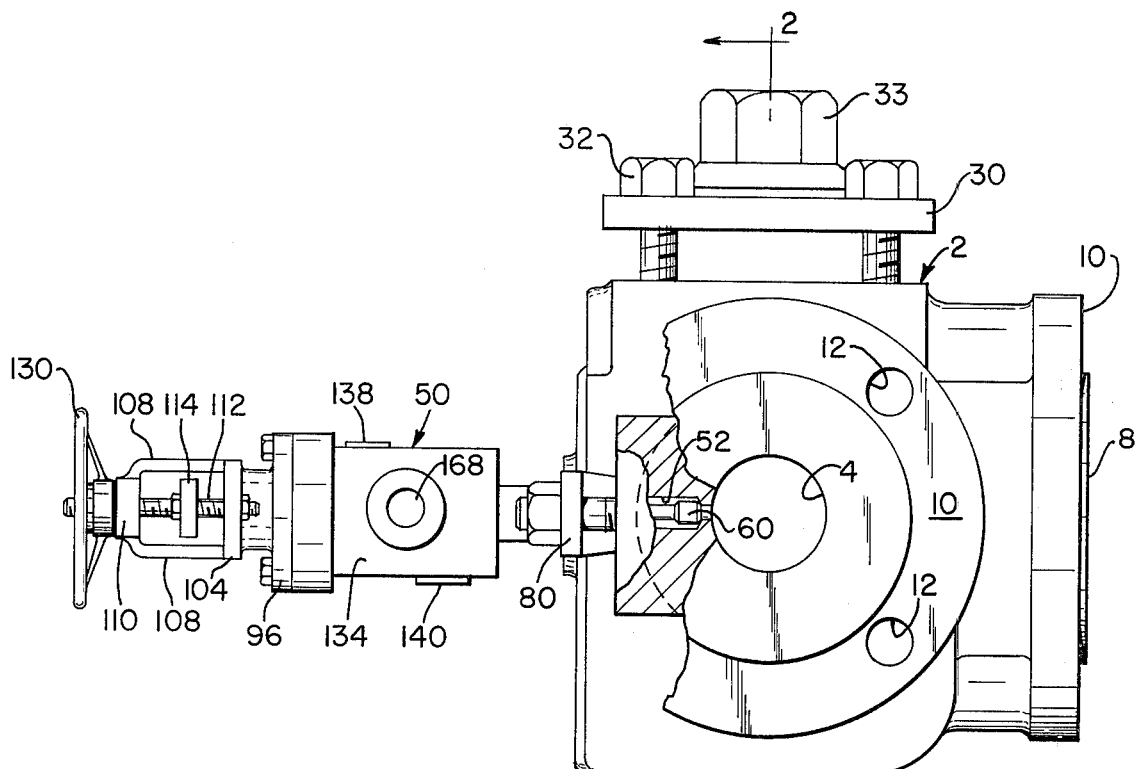
FIG. 1 is a side elevation of a plug valve forming part of a preferred embodiment of the invention.
Figure 2:
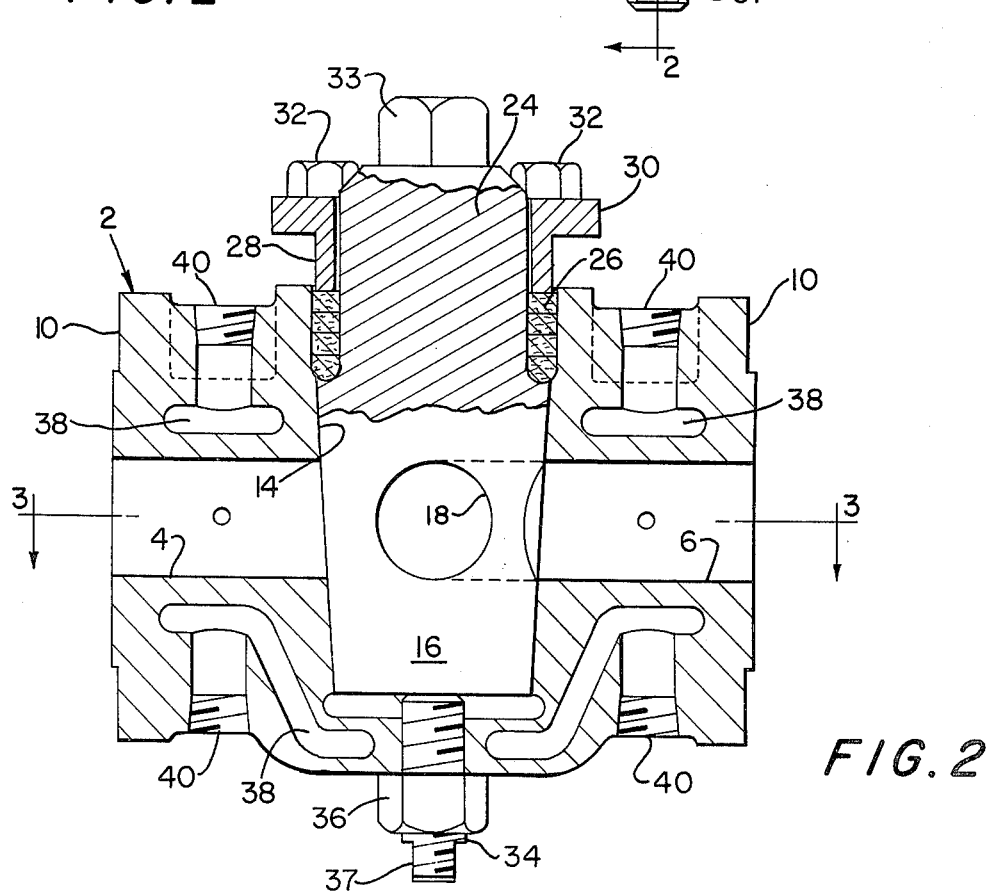
FIG. 2 is a sectional view in elevation taken along line 2—2 of FIG. 1.

Referring now to FIGS. 1 and 2, the illustrated embodiment of the invention comprises a jacketed three-way diverting plug valve which is characterized by a valve body 2 having three chambers or ports 4, 6 and 8 and flanged ends 10. Each flanged end 10 is provided with a plurality of tapped holes 12 for receiving screws for coupling the valve into a fluid handling system. Ports 4 and 6 are aligned with one another and each is disposed at a right angle to a third port 8. All three ports have the same diameter. Intersecting the three ports is a valve bore 14 which has a circular cross-section but is tapered to receive a conically tapered valve plug 16. The latter is formed with a passageway in the form of a bore 18 of circular cross-section, the bore being formed by cutting away a portion of the plug along a circular arc so as to form a small pillar 20 at the outer side of the plug. The diameter of bore 18 is the same as that of ports 4, 6 and 8 and the bore is located so that, by appropriately positioning the valve plug, the two ends of the bore will line up exactly and be flush with the inner ends of two of the three ports (see FIG. 3). Hence, bore 18 can function as a smooth continuity of the ports with which it is aligned. As is believed obvious, the plug is rotatable so that bore 18 can connect port 8 with either or both of ports 4 and 6. Port 8 can act as an inlet or outlet and ports 4 and 6 can act as the outlets or inlets of the plug valve.

The upper end of valve bore 14 is counterbored and the upper portion or stem 24 of valve plug 16 is reduced in diameter to provide an annular space to receiving a packing 26. An annular packing retainer member 28 surrounds the valve stem 24 and engages the packing. Retainer member 28 is provided with a peripheral flange 30 provided with a plurality of holes for receiving screws 32 that are screwed into tapped holes in the valve body and act on the retainer member to compress the packing so as to prevent leakage and also prevent the valve plug from moving up in bore 14. The upper end of stem 24 has a hexagonal cross-section as shown at 33 whereby it may be gripped by a wrench or hand wheel or other external turning means for rotating the plug. At the opposite end of valve bore 14 the valve body 2 is provided with a threaded hole for receiving a thrust bearing in the form of a threaded rod 34. The latter bears against the bottom end of the valve plug and coacts with retainer member 28 and packing 26 to prevent axial movement of the valve plug and also to keep the groove 18 vertically aligned with ports 4, 6 and 8. A nut 36 on rod 34 acts to lock the rod in place. Flat surfaces 37 are provided on the outer end of rod 34 to permit rotation thereof by a suitable wrench.

The foregoing plug valve is of the jacketed type. Thus in addition to the foregoing features, valve body 2 is provided with internal passageways 38 surrounding the three ports 4, 6 and 8 for circulating a heating fluid such as steam or hot oil or water. Passageways 38 terminate in suitable openings 40 which are adapted, e.g., by screw threads as shown, for coupling to pipelines which (not shown) form part of a heating fluid circulating system.

To the extent already described, the plug valve assembly of FIGS. 1–3 is conventional. However, for purposes of this invention the plug valve is modified to accommodate the valve stems of two auxiliary valves 50 (see FIGS. 1, 5 and 6). Accordingly, two like relatively small diameter bores 52 are formed in plug valve body 2 one as shown in FIG. 3 intersecting valve port 6 and the other as shown in FIG. 1 intersecting valve port 4. Bores 52 extend parallel to valve port 8 and are disposed so that their center lines intersect the center lines of ports 4 and 6, i.e., so that their center lines extend along a diameter of ports 4 and 6 as shown in FIG. 4. In this preferred embodiment of the invention each bore 52 comprises a relatively short reduced diameter section 52A that intersects one of the ports 4 and 6, and the remaining larger diameter of each bore 52 leads out of the rear side of valve body 2 (see FIG. 6).

Each of the auxiliary valves 50 comprises an elongate valve stem 54 which extends into one of the bores 52 and includes an end valve section 56 whose outer diameter is set so that it will make a precision (i.e., close) sliding fit in bore section 52A. The inner end or tip of valve section 56 is contoured to match the cross-sectional curvature of ports 4 and 6. More specifically the tip of each valve section 56 is formed with an end surface 58 which is curved with a radius of curvature equal to one-half the diameter of bores 4 and 6. Additionally valves 50 are constructed as later described so that stems 54 are movable axially but fixed against rotation, and surfaces 58 are oriented so that they can be positioned flush with the curved surfaces of bores 4 and 6 (as shown in FIG. 4). When so positioned the surfaces 58 present no impedance to flow of fluid along ports 4 and 6. Each stem 54 also is formed with an enlarged diameter stop section 60 which is sized so as to leave an annular space between it and the surrounding surface of bore 52. Each bore 52 is formed with a tapered shoulder 62 at the outer end of its reduced diameter section 52A and the length of each end valve section 56 is set so that when stop section 60 engages shoulder 62, its contoured end surface 58 will be flush with the curved surface of the associate valve port 4 or 6 as shown in FIG. 4. To facilitate flow of fluid into bore 52 from the associated port 4 or 6 when end valve section 56 is retracted from bore section 52A, it is preferred to bevel the inner end of stop section 60 as shown at 64. It is believed obvious from the foregoing discussion that when end valve section 56 is inserted into bore section 52A it effectively plugs the inner end of bore 52, and when the bevelled inner end 64 of stop section 60 engages shoulder 62 it effectively prevents any leakage from the associated port 4 or 6 which might occur between end valve section 56 and bore section 52A.

Figure 6:
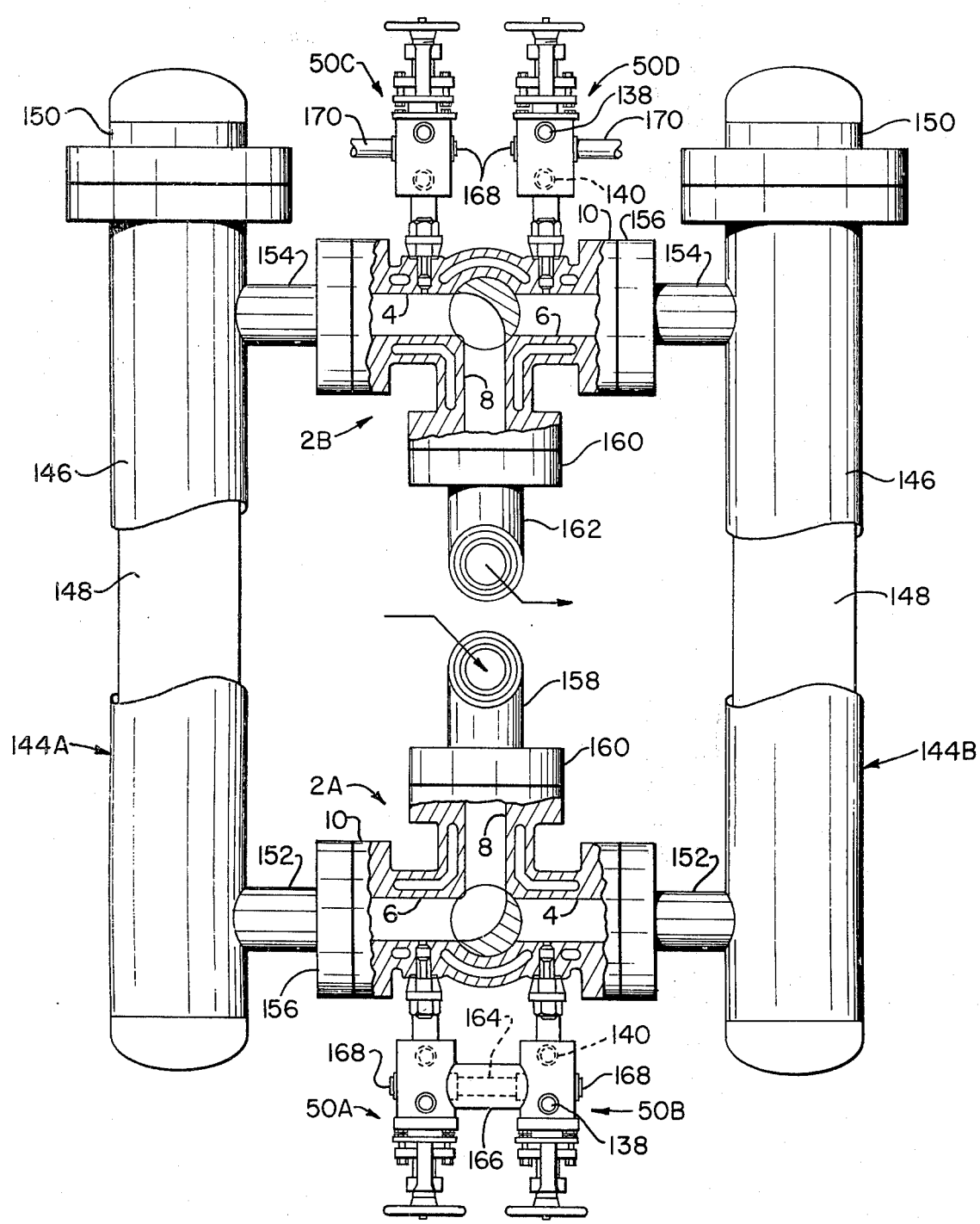
FIG. 6 illustrates a dual filter system embodying two plug valves as shown in FIG. 1, with one pair of auxiliary valves arranged for by-passing and the second pair arranged for venting.

Turning now to FIGS. 5 and 6, each of the valves 50 comprises a hollow body 68 having a center flow chamber 70 with two opposed side ports 71 and 72, and two axially aligned bores 74 and 76. One end of a cylindrical sleeve 78 extends into bore 74 and is welded to body 68, while its opposite end is secured, e.g. by welding or a screw connection, in an opening of a mounting plate 80 which is used to secure valve 50 to the plug valve body. For this purpose plate 80 has a plurality of holes to accommodate threaded mounting stubs 82 which are screwed into threaded blind holes in valve body 2 and receive nuts 84 that engage mounting plate 80.

The inner diameter of sleeve 78 is sized so as to leave an annular space between it and the associated valve stem 54, and radial projections 86 on the valve stem cooperate with the inside surface of sleeve 78 to keep stem 54 centered. As shown in FIG. 5A, one of the projections 86 has a greater dimension radially of stem 54 than the other projections and rides in a groove 87 in the inner surface of sleeve 78 so as to prevent stem 52 from rotating while permitting it to move axially. The upper end of stem 54 extends into an axially extending hole in a valve spindle 88 and is secured thereto by a diametrically extending locking pin 90. At the end opposite sleeve 78 the valve body 68 is provided with an enlarged circular flange 92 and spindle 88 extends through bore 76 beyond the end face of flanged end 92. An O-ring 93 seated in a groove in valve body 68 coaxial with bore 76 surrounds and engages spindle 88 so as to prevent leakage of fluid through bore 76. A bonnet 94 surrounds the spindle and has a circular flange 96 at one end which engages the end face of flanged end 92 and has holes to receive screws 98 that are screwed into tapped holes as shown to lock bonnet 94 to valve body 68. The end face of flanged end 92 has a shallow counterbore to accommodate gaskets 100 which are compressed by bonnet 94 and prevent fluid from leaking out between the bonnet and valve body 68.

At the end opposite flange 92, the bonnet 94 is counterbored to receive a packing 102 and is provided with a pair of diametrically extending ears 104 which have holes for receiving adjustment bolts 106 as shown. Additionally bonnet 94 comprises a yoke which consists of two arms 108 that are joined at their outer ends with a collar 110. The opposite ends of arms 108 are formed integral with ears 104.

Surrounding spindle 88 and sized to engage packing 102 is a gland 112 having a pair of diametrically opposed ears 114 with holes to accommodate bolts 106. The latter and nuts 116 cooperate with ears 114 and 104 respectively to cause the gland to compress packing 102.

The upper end of spindle 88 is threaded as shown at 122 and extends through collar 110. Disposed in collar 110 is a bushing 124 having a flange 126 that seats in a counterbore and engages a ring bearing 128 as shown. The inner surface of bushing 124 is threaded to mate with the threaded section of spindle 88. Mounted on and connected to bushing 124 so as to rotate therewith is a hand wheel 130. The latter may be connected to the hand wheel by a spline or by a key-keyway connection, and is held in place by a nut 132 that is screwed onto the bushing as shown.

If required, each valve 50 may be jacketed or otherwise provided with heating (or cooling) means. In this case the embodiments shown in FIGS. 1, 5 and 6 are provided with a jacket 134 which defines a chamber 136 and has ports 138 and 140 at opposite sides of the valve for coupling chamber 136 into a system (not shown) for circulating a heating or cooling fluid.

A further desirable feature is provision of a passageway for draining or flushing each bore 52 with a cleaning fluid. Thus, as shown in FIG. 5, a bore 137 intersects each bore 52 adjacent to its shoulders 62. Bore 137 leads outside of plug valve body 2 and preferably is threaded as shown at 139 to receive a plug (not shown) for closing it off until the flushing-operation is to be carried out.

FIG. 6 illustrates a dual filter system incorporating two changeover valve assemblies constructed as above described. More specifically, the system of FIG. 6 has two like filter units 144A and 144B, each of which comprises a housing 146 for a removable filter unit 148, a flanged end cover 150 removably bolted to the housing, and inlet and outlet lines 152 and 154 having end flanges 156 for connection to the flanged ends 10 of the two plug valves which are identified generally as 2A and 2B. The port 8 of plug valve 2A is coupled to a process fluid supply line 158 which may have a flanged end 160 that is attached to the end flange of the valve, while the port 8 of valve 2B is coupled to downstream equipment, e.g. extrusion equipment (not shown), by a process fluid delivery line 162 which may also have a flanged end 160 for securing it to the valve.

In the system of FIG. 6 the two valves 50A and B associated with changeover plug valve 2A are employed for by-pass purposes and thus their ports 72 are connected by a conduit 164, and the jackets 134 of the same valves are modified to include a third port concentric with ports 72 and connected by a sleeve 166 which connects the chambers 136 of the same valves. The other ports 71 of valves 50A and B are closed off by plugs 168. The two valves 50C and D associated with changeover plug valve 2B are employed for venting purposes and thus their ports 72 are closed off by plugs 168 while their ports 71 are connected to exhaust lines 170. Also, although not shown, it is to be understood that the two plug valves 2A and 2B and the four auxiliary valves 50A-D can be heated by means of a suitable heating fluid circulated by means of lines connected to ports 40 of the plug valves, ports 138 and 140 of both valves 50C and D, and port 138 of valve 50A and port 140 of valve 50B. The other ports 140 and 138 of valves 50A and B respectively can be closed off by plugs 168 if not needed for proper flow of heating fluid. Accordingly, heating fluid will flow from chamber 136 of valve 50A through sleeve 166 to chamber 136 of valve 50B. If desired, the jacket 134 of valves 50C and D may be modified to include third ports in each which may be connected by a sleeve like sleeve 166 so that heating fluid may be introduced into chamber 136 of one valve, and withdrawn from the corresponding chamber of the other valve.

A dual filter system featuring dual changeover valves with bypass and vent valving as shown in FIG. 6 is especially suitable for process systems handling highly viscous polymer process fluids at high temperatures and under high pressures. The system allows a small stream of process fluid to fill a second filter while the first is in service, and the flow through the bypass valves can be closely controlled to prevent a significant reduction in feedstock flow rate and pressure to downsteram equipment during changeover. Control of flow through the bypass valves also is important to control the rate of filling the new filter unit to prevent stagnation or degradation of, for example, polyester materials, due to a long residence time in the filter unit under high temperatures. These advantages are rendered obvious from the following description of the changeover procedure.

FIG. 6 shows a normal operation phase with filter unit 144A on line. During this normal operation phase, bypass valves 50A, B and vent valves 50C, D and closed and plug valves 2A and B are set so that the hot process fluid flows from supply line 158 through valve 2A into filter 144A, passes through the filter, and discharges into valve 2B which directs it to delivery line 162. When the pressure drop across the on-line filter 144A reaches the point where a changeover to the clean filter 144B must be made, bypass valves 50A and B are opened to allow a stream of process fluid to bypass the valve plug of valve 2A and flow off into filter 144B. This stream exits port 6 of valve 2A via valve 50A and reenters port 4 of the same valve via valve 50B. As this stream enters filter unit 144B, vent valve 50D is opened to permit air and vapor to vent from the same filter. Control of bleed volume and pressure can be obtained by throttling one or both bypass valves to prevent excessive pressure drop in filter 144A and maintain steady flow to downstream equipment. Vent valve 50D is closed off when filter 144B is completely filled, e.g., as indicated by discharge of process fluid from the vent valve. Thereafter, with the two bypass valves still open, both changeover valves 2A and 2B are operated simultaneously so as to divert flow from filter 144A to filter 144B. As the plugs 16 of valves 2A and 2B are rotated to align their passageways 18 with their ports 8 and their ports 4 and 6 respectively, the flow through filter 144A will diminish and the flow through filter 144B will increase. The flow areas of the two changeover valves can be calculated to provide minimum pressure peaks of the process fluid supply stream. The open bypass valves also further minimize undesirable pressure peaks by providing extra flow passages for the process fluid during changeover. When the plugs of the two changeover valves have reached their new operating positions so that full flow of process fluid is through filter 144B, the two bypass valves are closed. Thereafter, any residual pressure in filter 144A is relieved by opening vent valve 50C. Filter unit 144A is opened for cleaning after the pressure therein has been safely dissipated. Any process fluid remaining in the bypass valves 50A and B can be drained by opening their drain ports 71. Preferably, however, solvent cleaning fluid is circulated through the two bypass valves via flushing passageways 137 and their drain ports 71. Vent valves 50C and D can also be cleaned in place by flushing them while closed with a solvent cleaning fluid via their corresponding flushing passageways 137 and drain ports 71. Once filter unit 144A has been cleaned, the system is ready for a new changeover operation, with vent valve 50C rather than 50D being open while filter 144A is being filled via the bypass valves.

FIG. 7 illustrates one possible modification of the invention. In this modification the rear side of the valve body of valve 2A is provided with a boss 174 and the member 80 is omitted from each valve 50. Instead, the inner end of the sleeve 78 of each valve 50 is threaded and screwed into a tapped hole in boss 174. One projection 86 is provided on the stem 54 of the valve 50 and the inside diameter of sleeve 78 is sized so that the stem makes a close sliding fit with the sleeve. A groove 87 is provided on the inner surface of sleeve 78 to slidably receive projection 86 so as to prevent rotation of stem 54. Additionally, the inner end of sleeve 78 is counterbored so as to provide a tapered seat 176 for the enlargement 60 on stem 54. The rear side of valve body 2 of the associated plug valve is formed with two drain or flushing passageways 177 and 178 which intersect bore 52 of its port 6 (although not shown, it is to be understood that similar passageways 177 and 178 are provided with respect to the bore 52 which intersects the port 4 of the plug valve). The outer end of passageways 177 and 178 are threaded as shown at 180 to receive plugs (not shown) for closing off the passageways. For this modification the bodies of valves 50 do not require the use of ports 71 and 72 for draining or cleaning purposes. When valve stem 54 is in its extended position, its contoured end section 56 plugs the reduced diameter bore section 52A and its enlargement 60 seats on shoulder 62. Thus no process fluid can pass out of the plug valve through bore 52. However, when stem 54 is retracted, its enlargement 60 mates with seat 176 and feedstock can flow out of plug valve via bore 52 and passageway 178. If cleaning or draining is desired, stem 54 is extended to close off bore section 52A and passageways 177 and 178 are opened to drain any residual process fluid and also to permit flushing with a suitable solvent.

FIG. 8 illustrates a further modification of the invention which comprises a three-way valve for use where it is desired to provide flow in two directions simultaneously, e.g. to both filter units at the same time. FIG. 8 is a fragmentary cross-section of a plug valve wherein the valve body 2 includes a fourth bleed port 7 in addition to main ports 4, 6 and 8. Bleed port 7 is disposed opposite to port 8 and at right angles to ports 4 and 6. Instead of having a flow passageway as shown in FIG. 3, the valve plug 16 has two full round bores 18A and 18B which intersect one another at a 90° angle as shown. Bores 18A and B have the same diameter as ports 4, 6 and 8. Either path of the plug valves 2A and 2B of FIG. 6 may be modified as shown in FIG. 8. By appropriately positioning the valve plug, fluid introduced via port 8, for example, may be made to flow out of either or both of ports 4 and 6. When bore 18B is aligned with either of ports 4 and 6, process fluid can be discharged from bore 18A via bleed port 7. However, if bore 18B is aligned with port 8 so that bore 18A is aligned with borh ports 4 and 6, the body of valve plug 16 will block off bleed port 7. The primary purpose of bleed port 7 is to provide continuous flow of process fluid through the entire length of bore 18A when only one end of bore 18A is aligned with one of the ports 4, 6 and 8, as in FIG. 8. Without bleed port 7 process fluid would tend to be trapped and stagnate at the blocked end of bore 18. Bleed port 7 may also serve other purposes. Thus it may be used for sampling process fluid or for introducing a selected material e.g. a coloring agent, into the process fluid. It also may be used as a bleed to control the pressure and flow rate of fluid passed by the plug valve to downstream equipment. For such other purposes it may be desirable to connect bleed port 7 to a conduit or to adapt it to receive a plug (not shown) for selectively closing it off.

It is believed obvious from the foregoing description of FIG. 6 that the bypass and vent valve assemblies can be drained and flushed in place without adjustment or movement of the two changeover valves, thereby avoiding feedstock contamination or disturbance of feedstock flow. The contoured tips of the bypass and vent valve stems eliminate cavities or recesses which may trap process fluid. Trapping of process fluids is particularly objectionable with fluids that tend to degrade under heat if not flowing at suitable rates. Also the fact that they cannot rotate, insures tight shut off with no danger of galling.

In this connection, it is to be appreciated that the seating of the stop sections 60 of valve stems 54 on shoulders 62 insures that the contoured tips will be flush with the plug valve bore 14. Further, if the filter system is shut down for periodic maintenance, the entire bypass assembly can be easily and quickly detached for mechanical cleaning after removal. An additional important advantage of the bypass feature is that it makes it possible to balance the pressure across the ports 4 and 6 of the changeover valve, thus reducing the torque required to operate the plug when the valve is subjected to a relatively large pressure differential.

Further the vent valve makes it possible to relieve pressure locked in the dirty filter unit before it is opened for cleaning, thus avoiding possible injury or damage to operators of adjacent equipment.

While the two diverting valves with their associated bypass and vent valving are companion units in the system of FIG. 1, it is to be recognized that either may be used separately in other fluid handling systems. Also, dual changeover valves with bypass and vent valving as herein described are not restricted to use with filters and instead, for example, may be used with two chemical reactors where it is desired to changeover from one reactor to another. In such case, the changeover valve 2A would be installed in the feed lines to the two reactors and valve 2B would be connected to the reaction product withdrawal lines of the same reactors. Furthermore, it is to be appreciated that the bypass and vent valves, and also the changeover valves with which they are associated, may be construed other than as herein described and illustrated. Thus, for example, the plug valve could be a two-way or four-way valve.

A further modification is contemplated where the diverter valves are not large enough to permit mounting the auxiliary bypass and vent valves directly to the diverter valve body as shown in FIGS. 1 and 5–7. In such case the auxiliary valves may be installed in the piping connecting each diverter valve and each filter (or whatever other equipment such as chemical reactor is connected to the diverter valve). This may be achieved, for example, by mounting each auxiliary by-pass valve to a mounting block or spacer (not shown) installed between each diverter valve flange 10 and the end flange 156 of the associated filter inlet line 152 or outlet line 154. In such case, the mounting block or spacer will have a main fluid passageway connecting the associated port of the diverter valve with the associated filter inlet or outlet line, and also a small diameter bore like that shown at 52 which intersects the main fluid passageway and is sized to receive the valve stem 54 of the auxiliary valve. The main fluid passageway of each mounting block or spacer will have a circular cross-section and the valve stem 54 of the auxiliary valve will be oriented so that its contoured inner end surface 58 will match the cross-sectional contour of the fluid passageway in the mounting block and be flush with the surface of such passageway when the valve stem is extended, in the manner shown in FIGS. 3 and 4. It is believed obvious that for this modification longer lines 164 and 166 are required to connect the two by-pass valves 50A and 50B.

Still other modifications will be obvious to persons skilled in the art.

I claim:

1. Apparatus comprising:
a plug valve and first and second auxiliary valves mounted to said plug valve;
said plug valve comprising a valve body having a chamber for receiving a valve plug and at least a first port and a second port communicating with said chamber, first and second openings in said valve body intersecting said first and second ports respectively, and a valve plug rotatably mounted in said chamber, said valve plug having a passageway for controlling flow of fluid through said valve body via said first and second ports;
said auxiliary valves each comprising a stem having a stop portion which is disposed in one of said openings and is adapted to close off said one opening when said stem is in a first position and to open said one opening when said stem is in a second position, and means for moving said stem axially between said first and second positions; and
means connecting said first and second openings so that fluid can bypass said valve plug when the stems of said bypass valves are in said second positions.

2. Apparatus according to claim 1 wherein said first and second ports each comprises a cylindrical surface, and further wherein each of said stems has an end surface which is contoured to mate flush with said cylindrical surface.

3. Apparatus according to claim 2 wherein said auxiliary valves include means for preventing rotation of said stems.

4. Apparatus according to claim 1 wherein each of said auxiliary valves comprises a chamber leading to one of said plug valve openings and a port leading to said chamber; and
further wherein said connecting means comprises a conduit connecting the ports of said first and second auxiliary valves.

5. Apparatus according to claim 1 wherein said connecting means comprises a conduit directly connecting said first and second openings.

6. Apparatus according to claim 1 wherein said plug valve body comprises a third port and said valve plug passageway is adapted to connect said third port with either or both of said first and second ports.

7. Apparatus according to claim 6 further including first and second process equipment means connected to said first and second ports respectively.

8. Apparatus according to claim 7 further including a second plug valve as defined in claim 6, and means connecting said first and second process equipment means to the first and second ports respectively of said second plug valve.

9. Apparatus according to claim 8 further including third and fourth auxiliary valves connected to said second plug valve for selectively opening and closing off the first and second openings respectively of said second plug valve.

10. Apparatus according to claim 9 wherein said third and fourth auxiliary valves have vent ports communicating with the first and second openings of said second plug valve, whereby said process equipment means may be vented via said third and fourth auxiliary valves.

11. Apparatus according to claim 9 wherein said first and second ports of said first-mentioned plug valve each comprise a cylindrical surface, and further wherein the stems of said first and second auxiliary valves have end surfaces which are contoured to mate flush with the said cylindrical surfaces of the first and second ports respectively of said first-mentioned plug valve.

12. Apparatus according to claim 9 wherein each of said third and fourth auxiliary valves comprises a stem having a stop portion which is disposed in one of the openings of said second plug valve and is adapted to close off said one opening when said stem is in a first position and to open said one opening when said stem is in a second position, each of said third and fourth auxiliary valves also comprising means for moving the stem thereof axially between said first and second positions.

13. Apparatus according to claim 12 wherein the first and second ports of said second plug valve each comprises a cylindrical surface, and further wherein the stem of each of said third and fourth auxiliary valves has an end surface which is contoured to mate flush with the cylindrical surface of the corresponding one of the first and second ports of said second plug valve.

14. Apparatus according to claim 1 further including an aperture in the outer surface of said plug valve body and a clean-out passageway in said plug valve body leading from said aperture to one of said openings, whereby said one opening may be drained or flushed with a cleanig fluid.

15. Apparatus comprising a main valve and first and second auxiliary valves mounted to said main valve;

said main valve comprising a valve body with at least first, second and third ports, first and second openings in said valve body intersecting said first and second ports respectively, means defining first and second valve seats in said valve body for said first and second openings respectively, and flow control means for selectively controlling flow of fluid through said valve body between said third port and said first and second ports;

said first and second auxiliary valves each comprising a stem with a valve head, the stems of said first and second auxiliary valves being disposed so that said valve heads engage said first and second seats and block off said first and second openings respectively when said stems are in a first position and are disengaged from said first and second seats and unblock said first and second openings respectively when said stems are in a second position, and means for moving said stems from one to the other of said first and second positions.

16. Apparatus according to claim 15 wherein each of said auxiliary valves comprises a chamber communicating with one of said openings in said main valve body and a port communicating with said chamber, whereby fluid can flow between said auxiliary valve ports and said openings in said main valve body via said chambers when said valve heads are disengaged from said valve seats.

17. Apparatus according to claim 16 further including means connecting the ports of said first and second auxiliary valves so that fluid can pass from said first port to said second port via said first and second openings in said valve body and said auxiliary valve chambers when said valve heads are disengaged from said valve seats.

18. Apparatus according to claim 15 further including means connecting said first and second openings in said main valve body so that fluid can pass from said first port to said second port via said first and second openings when said valve heads are disengaged from said valve seats.

19. Apparatus according to claim 15 further including at least one passageway in said valve body leading to one of said first and second openings for draining fluid from said one opening.

20. Apparatus according to claim 15 further including a second main valve having a valve body with first, second and third ports, and flow control means for selectively controlling flow of fluid through the valve body of said second main valve between the third port and the first and second ports thereof, first and second process equipment means each having an inlet and an outlet, conduit means connecting the first and second ports of said first-mentioned main valve to the inlets of said first and second process equipment means respectively, and conduit means connecting the first and second ports of said second main valve to the outlets of said first and second process equipment means respectively, whereby by operation of the flow control means of said main valves fluid can be directed to flow through either or both of said first and second process equipment means.

21. Apparatus according to claim 20 wherein said process equipment means are filters.

22. Apparatus comprising a main valve and first and second auxiliary valves;

said main valve comprising a valve body with at least first, second and third ports, and flow control means for selectively controlling flow of fluid through said valve body between said third port and said first and second ports;

said first and second auxiliary valves each comprising a stem with a valve head, and means for axially and non-rotatably reciprocating said stem; and means defining first and second openings in said valve body communicating with said first and second ports respectively, and means defining first and second valve seats in said valve body for the valve heads of said first and second auxiliary valves respectively;

the stems of said first and second auxiliary valves being disposed in said first and second openings respectively so that the valve heads of said first and second auxiliary valves engage said first and second valve seats respectively and block off said first and second openings respectively when said stems are in a first position and are disengaged from said first and second valve seats respectively and unblock said first and second openings when said stems are in a second position.

* * * * *

UNITED STATES PATENT OFFICE
CERTIFICATE OF CORRECTION

PATENT NO. : 3,935,108
DATED : January 27, 1976
INVENTOR(S) : Louis V. Forgues

It is certified that error appears in the above-identified patent and that said Letters Patent are hereby corrected as shown below:

In the title, change "Bent" to "Vent"

Signed and Sealed this twenty-seventh Day of April 1976

[SEAL]

Attest:

RUTH C. MASON
*Attesting Officer*

C. MARSHALL DANN
*Commissioner of Patents and Trademarks*